United States Patent
Klaffert (10) Patent No.: US 9,810,875 B2
(45) Date of Patent: Nov. 7, 2017

(54) ADJUSTABLE MOUNTING ARRANGEMENT FOR AN OBJECT TO BE POSITIONED PRECISELY RELATIVE TO A BASE

(71) Applicant: MBDA Deutschland GmbH, Schrobenhausen (DE)

(72) Inventor: Thomas Klaffert, Freising (DE)

(73) Assignee: MBDA Deutschland GmbH, Schrobenhausen (DE)

( * ) Notice: Subject to any disclaimer, the term of this patent is extended or adjusted under 35 U.S.C. 154(b) by 0 days.

(21) Appl. No.: 15/031,959

(22) PCT Filed: Oct. 28, 2014

(86) PCT No.: PCT/DE2014/000543
§ 371 (c)(1),
(2) Date: Apr. 25, 2016

(87) PCT Pub. No.: WO2015/062567
PCT Pub. Date: May 7, 2015

(65) Prior Publication Data
US 2016/0266346 A1    Sep. 15, 2016

(30) Foreign Application Priority Data

Oct. 28, 2013  (DE) .................. 10 2013 017 874
Oct. 28, 2013  (DE) .................. 20 2013 011 930 U (51) Int. Cl.
*G02B 7/182* (2006.01)
*G02B 7/183* (2006.01)
*G02B 23/02* (2006.01)

(52) U.S. Cl.
CPC ............. *G02B 7/182* (2013.01); *G02B 7/183* (2013.01); *G02B 7/1827* (2013.01); *G02B 23/02* (2013.01)

(58) Field of Classification Search
CPC ....... G02B 7/1827; G02B 7/183; G02B 23/02
(Continued)

(56) References Cited

U.S. PATENT DOCUMENTS 4,655,563 A * 4/1987 Plante .................... G02B 26/06
                                                              359/849
5,414,564 A * 5/1995 Pausch ............... G02B 26/0816
                                                              359/846
(Continued)

FOREIGN PATENT DOCUMENTS

DE         602 01 429 T2     11/2005
WO         WO 99/38044 A1     7/1999
(Continued)

OTHER PUBLICATIONS

PCT/DE2014/000543, International Search Report dated Feb. 16, 2015 (Two (2) pages).

*Primary Examiner* — Ricky D Shafer
(74) *Attorney, Agent, or Firm* — Crowell & Moring LLP (57) ABSTRACT

An adjustable support assembly for an object to be accurately positioned relative to a base, in particular for a secondary mirror of an optical mirror telescope, has at least one support structure connected to the base and to the object. The support structure has at least two struts extending in a non-parallel manner relative to each other, where each strut has associated therewith a drivable actuator element in such a way that the actuator element applies a force onto the strut that deflects the strut transversely to the longitudinal extension thereof. The support structure may be supported in an articulated manner relative to the base.

13 Claims, 5 Drawing Sheets

(58) Field of Classification Search
USPC .................................. 359/399, 846, 849, 876
See application file for complete search history.

(56) References Cited

U.S. PATENT DOCUMENTS

| | | | |
|---|---|---|---|
| 6,402,329 B1 | 6/2002 | Bailly et al. | |
| 6,404,547 B1* | 6/2002 | Hull | G02B 7/1815 359/365 |
| 7,631,839 B1* | 12/2009 | Duncan | B64G 1/105 244/158.1 |
| 2004/0105138 A1 | 6/2004 | Billet | |
| 2007/0284502 A1* | 12/2007 | Hsin | G02B 7/005 248/495 |
| 2010/0172044 A1* | 7/2010 | Van Haendel | G02B 26/0816 359/871 |
| 2010/0202071 A1* | 8/2010 | Preumont | G02B 26/06 359/849 |
| 2016/0274329 A1* | 9/2016 | Klaffert | G02B 7/1827 |

FOREIGN PATENT DOCUMENTS

| | | |
|---|---|---|
| WO | WO 02/084361 A1 | 10/2002 |
| WO | WO 2010/043040 A1 | 4/2010 |

* cited by examiner

ADJUSTABLE MOUNTING ARRANGEMENT FOR AN OBJECT TO BE POSITIONED PRECISELY RELATIVE TO A BASE

Exemplary embodiments of the present invention relate to an adjustable support assembly for an object to be accurately positioned relative to a base. In particular, exemplary embodiments of the invention relate to an adjustable support assembly for a secondary mirror of an optical mirror telescope.

Optical mirror telescopes may be designed and applied both for receiving optical radiation (for example: classical telescope) and for transmitting optical radiation (for example: laser active system).

Most designs of optical mirror telescopes require a structure that allows, in the region of the aperture thereof, a suspension of a catch mirror (or secondary mirror) corresponding to a main mirror (or primary mirror). Both mirrors have to be very accurately positioned relative to each other so that on the one hand their optical axes are, in an ideal case, exactly coaxial, and on the other hand the adjusted focal distance is preferably invariable under any external condition. Any modifications to the distance would entail a change of the focusing plane, any deviations from coaxiality would cause imaging errors or would, in the case of a transmission telescope, degrade the spot quality, i.e. would for example increase the spot radius of a transmitted laser beam.

Large telescope pivot angles in the gravity field of the earth moreover constitute great challenges for the rigidity of the structure, which at the same time has to satisfy high thermal requirements. Depending on the structural concept of the telescope design, more or less strong shadowing effects will inevitably be caused by the required connection beams between the main and catch mirrors (primary and secondary mirrors). In the case of transmission telescopes, such as for example beam directing units for high-energy lasers, this problem exacerbates in two respects:

The structural parts shadowing the main mirror would absorb a significant part of the emitted energy, which in the short term leads, due to high temperature gradients, to thermal problems in the structure of the telescope. The reflected part would here moreover lead to harmful scattered light.

Very high directing speeds and accelerations in conjunction with large directing angles including overhead pivoting movements, such as for example during targeted designation and tracking, require, apart from the required static rigidity, additional structural-dynamic characteristics that are typically in conflict with the aim of achieving minimal shadowing.

PRIOR ART

In order to overcome these problems, a direct fixing of the catch mirror (secondary mirror) within a glass sheet provided at the aperture (entrance or exit aperture) of the telescope would be conceivable. Since such a direct fixing of the catch mirror (secondary mirror) would be feasible, with small apertures, only for small telescope structures due to material-related and geometry-related rigidity limits and because of the limited possibilities of a spatial fine adjustment, currently known solutions avoid this problem as a rule by means of ensuring that individual beams run between the structural parts, which therefore form sub-apertures. These beams can subsequently be geometrically coupled outside of the telescope, however, in this case always only part of the main mirror surface can be used. Consequently, such telescope structures are not suitable for being linked to a Coudé beam path because the resulting rolling motion of the beam bundles on the mirrors corresponding to the sum of the directing angle modifications is no longer possible due to the fixed mounting position of these sub-apertures. To this end, the entire telescope structure would have to co-rotate synchronously, which would lead to considerable additional problems with respect to the achievable directing dynamics (due to the additional inertia around the roll axis), rigidities (reduction of the rigidity due to additional supports) and accuracies (due to the additional load caused by gyroscopic movements). Moreover, all of the data and supply lines would have to be installed via rotary feedthroughs or other transfer means. Accordingly, a full utilization of the main mirror surface would be achievable only by means of an off-axis arrangement of both mirrors, which results in considerable production complexity of the mirrors and the related feasibility limits.

In other application, it may also be necessary to support two objects relative to each other and to position them accurately, for example coaxially, relative to each other.

It is therefore an object of the present invention to provide an adjustable support assembly for an object to be accurately positioned relative to a base, in particular for a secondary mirror of an optical mirror telescope, wherein an extremely accurate positioning of the object can be achieved with low efforts.

This support assembly according to one embodiment of the invention has at least one support structure connected to the base and to the object. The support structure in turn may have at least two struts which extend in a non-parallel manner relative to each other, wherein each strut has associated therewith a drivable actuator element in such a way that the actuator element, under the effect of a drive, applies a force that causes a deflection of the strut in a direction transversely to the longitudinal extension thereof, and wherein the support structure is supported in an articulated manner relative to the base.

This design allows individual struts to be deflected by applying a force, for example to be slightly bent under the effect of a bending moment resulting thereby, so that—in the deflected condition of the strut—the direct distance between the two ends of the strut (linear distance) relative to the distance thereof in the case of a straight extension of the strut is slightly reduced, which results in a minimal displacement of the object in the direction of this strut. This very sensitive reduction of the effective linear distance between the two ends of the strut is achieved as a result of the fact that the deflection of the strut is used as a type of gear reduction for the movement of the actuator element that is used to apply the force onto the strut. This means that the travel of the actuator element is transferred with a reduction into a modification of the linear distance between the two ends of the strut.

Preferably, the actuator element can be driven by an actuating drive. In this way, the travel of the actuator element and thus the change to the linear distance between the two ends of the strut can be accurately adjusted. It is of advantage here if the actuator element is a driven element of the actuating drive.

It is also particularly advantageous if the support structure has at least four struts that extend in a non-parallel way relative to each other. As a result, the object can be positioned in the space even better, because as a result of the possibility according to exemplary embodiments of the invention of changing the linear distance between the two ends of each strut, also the inclination and the rotational orientation of the object can be adjusted.

Preferably, the support assembly has at least two, preferably at least three, further preferred at least four support structures connected to the base and to the object. If in this respect each of the support structures is equipped with the adjustment mechanism according to exemplary embodiments of the invention for changing the linear distance between the two ends of each strut, then a multiplicity of possibilities of adjusting the position and the orientation of the object is provided.

A particularly effective fine adjustability is achieved as a result of the fact that each of the struts has a first end section close to the base and a second end section close to the object, and that the associated actuator element is positioned in such a way that it applies the force exerted on the strut under the effect of a drive onto one of the end sections of the strut. This application of the force not in the central section of a strut, but onto the end section thereof, allows the drive to be placed for the adjustment of the actuator element at the perimeter of the support assembly, as a result of which the latter, for example in the case of the use thereof in a telescope, will not contribute to shadowing of beams.

Preferably, each of the struts has a strip-like shape. Such struts have a first width extension, which is multiple times higher than the second width extension in the direction orthogonal to the first width extension. As a result, the strut can be easily bent in the direction transversely to the plane of the first, longer width extension, whereas it has a high bending stiffness in the plane of the first, longer width extension. This allows a defined bending of the strut in a predetermined direction, namely in a plane that is perpendicular to the first, longer width extension. Moreover, the visible clear cross-section of the strut, if viewed in the direction of the second, shorter width extension, is very small, so that the strut forms only a very slight shadowing surface for beams running in this direction.

It is also particularly advantageous if the actuator element associated with each strut or a further actuator element, which can preferably also be driven by an actuating drive, of the strut is associated in such a way that this actuator element, under the effect of a drive, applies a force onto the strut that exerts a torsional moment onto the strut. As a result it is possible not only to effect the deflection of the strut as described above in the plane extending transversely, in particular at right angles, to the first, longer width extension, but the strut can also be twisted in itself, in order to minimize for example the clear cross-section of the strut for beams extending in a predetermined direction. Also, by applying different forces in a targeted manner onto the respective strut of a support structure orientated at an angle in relation to the optical axis of the telescope, a torsion of this support structure or of the struts thereof can be effected, which also results in a minimization of the clear cross-section of the struts for beams running in a predetermined direction.

This minimization of the clear cross-section of the support structure by way of twisting the struts is of particular advantage if the support assembly according to exemplary embodiments of the invention is used in a telescope of a laser active system, because in this case it is possible by such a minimization of the clear cross-section of the individual struts to minimize the strut surface, onto which laser beams are incident, as a result of which both the heating of the struts and radiation losses are markedly reduced. In this way, also flat angles of incidence onto planes formed by the surfaces of the individual struts can be avoided or reduced, which would entail far-reaching and thus particularly harmful scattered light (as opposed to blunt edges or rounded surfaces, where the scattered light diverges within very short distances).

If the actuating drives of all of the actuator elements are connected with a common control unit for transferring actuating signals, the complexity of the adjustment of the position and the orientation of the object, which is caused by the multiplicity of adjustment possibilities of the individual struts, can be reliably mastered.

In a particularly preferred embodiment, the support assembly is provided with a plurality of support structures which form a suspension of a secondary mirror corresponding with a main mirror, wherein the base connected to the support structures is formed by a mirror telescope housing, wherein the object is formed by a mounting unit of the secondary mirror and wherein the secondary mirror can be coaxially adjusted by means of the actuator elements in relation to the main mirror in respect of the mirror telescope axis thereof. This embodiment of the invention is particularly advantageous if the telescope is part of a laser active system emitting radiation. However, the invention can also be used on telescopes receiving radiation, and in this case the catch mirror corresponds to the above-mentioned secondary mirror.

It is of advantage if the strip-like struts of the support structures are arranged in such a way that their planar sides extend in a plane orientated substantially parallel to the mirror telescope axis. In this respect, shadowing of the beams passing through the telescope by the struts is minimized.

This support assembly according to one embodiment of the invention thus provides a "structural concept through which beams can pass", which minimizes the above-described shadowing problems in such a way that:

developing scattered light can always be limited owing to the adaptability of the structure to noncritical intensities that can be predicted, thermal influences due to absorption and to external environmental effects can become controllable, and the structural-dynamic properties for very high directing accelerations are realized within telescope pivot angles of any desired size.

Exemplary embodiments of the invention will be explained in more detail below with reference to the drawings, wherein

DETAILED DESCRIPTION

Figure 1:
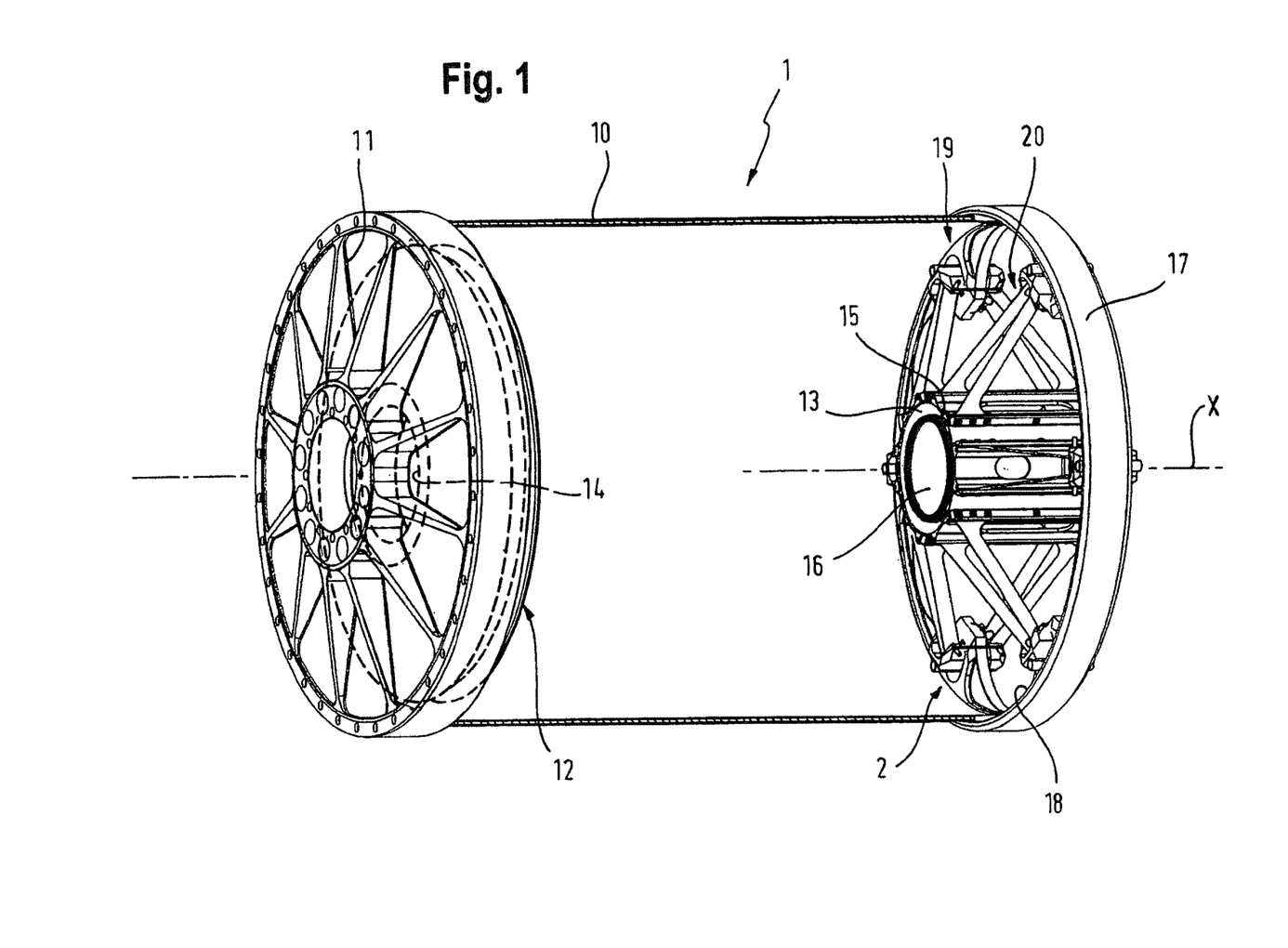
FIG. 1 shows a perspective, partially sectioned view of a telescope equipped with a support assembly according to exemplary embodiments of the invention for the secondary mirror.

FIG. 1 shows a telescope 1 in a partially sectioned perspective view. The telescope 1 comprises a cylindrical housing 10, on one end of which an annular, concave primary mirror 12, which is also referred to as the main mirror, is provided with a central, first aperture 14 on a support structure 11 fixed to the housing. In the region of the other end of the telescope 1, a secondary mirror 16, which is also referred to as a catch mirror, is centrally provided, which is supported on the cylindrical housing 10 by means of a support assembly 2 according to exemplary embodiments of the invention and a frame ring 17. The primary mirror 12 and the secondary mirror 16 are coaxially orientated in relation to the longitudinal axis X of the cylindrical housing 10. An annular second aperture 18 surrounds the secondary mirror 16 and is delimited on the outside by the cylindrical housing 10.

The support assembly 2 has a plurality of support structures 20 of identical construction, in FIG. 1 six support structures, each of which extends between bracket means 15 of the secondary mirror 16 and support means 19 provided on the frame ring 17 connected to the housing 10. The support assembly 2 according to exemplary embodiments of the invention forms a multi-membered kinematic structure supported in relation to the primary mirror 12 on the housing 10, i.e. fixed to the frame. The construction of the support assembly 2 and in particular of the support structures 20 will be described with reference to FIG. 2 by way of a simplified example with just three support structures 20, 20', 20" which are required as a minimum.

The three support structures 20, 20', 20" are of identical construction, so that only the support structure 20 will be described in detail below; this description analogously also applies to all of the other support structures. An inner cylindrical bracket element 13 forms, at its upper front end, the bracket means 15 for the secondary mirror 16, which is not illustrated in any more detail in the example shown. The housing 10 of the telescope 1 and the frame ring 17 with the support means 19 are, for reasons of clarity, also only shown in FIG. 2 in sections in the region of the support structure 20'''.

Figure 2:
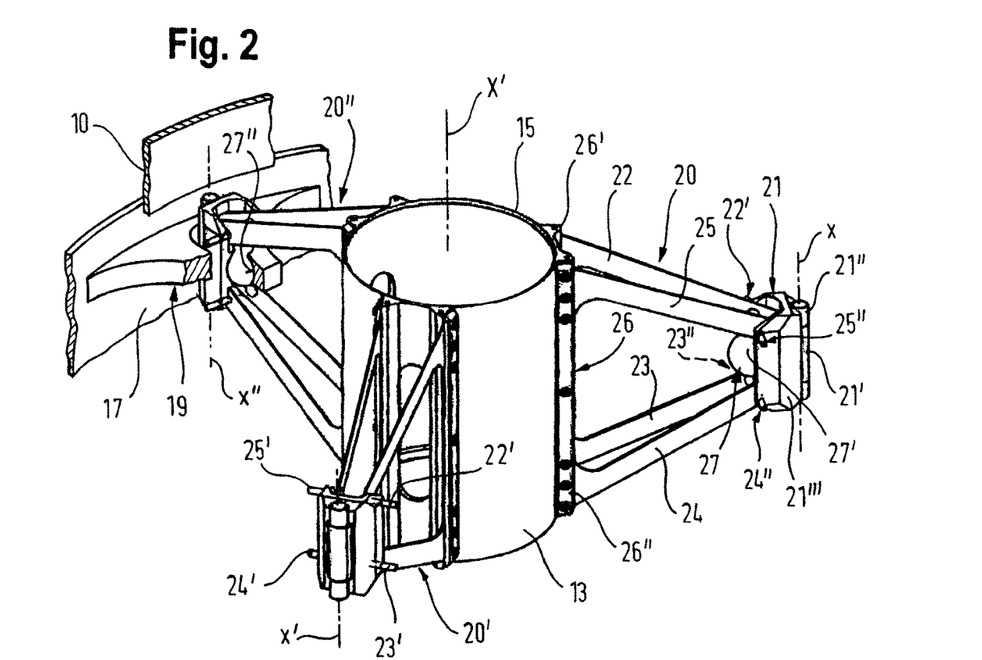
FIG. 2 shows a perspective view of a support assembly according to exemplary embodiments of the invention having three support structures.

The housing 10 forms a basis for the support structures 20, 20', 20" and the object held by the support structures 20, 20', 22" is, in the example shown, the secondary mirror 16 attached to bracket means 15. The support structures 20, 20', 22" are each pivotably supported on the respectively associated support means 19 of the frame ring 17 connected to the housing 10 by way of a cradle 21 provided with a hinge. In the case of the support structures that are arranged at right angles to each other, the hinge of the cradle 21 may in principle be formed as a blade hinge with one degree of freedom, provided it is possible to go without the option of scattered light minimization.

In order to avoid this limitation it is, as is also shown in the figures, preferably formed as a ball joint 27 with three degrees of freedom.

On the respective cradle 21, four struts 22, 23, 24, 25 are attached, which extend in a non-parallel manner relative to each other radially inwards to an anchoring structure 26 attached to the cylindrical bracket element 13. The struts 22, 23, 24, 25 are for example formed from an X-shaped sheet metal part, which is bent over with its central section 21' about a support pin 21" of the cradle 21, which forms a cradle support, and is passed through an opening in the cradle body 21'" of the cradle 21. The support pin 21" is supported on the radially outer side of the cradle body 21'". Each support pin has a longitudinal axis x, x', x", which in the non-deflected condition of the support structures extends parallel to the longitudinal axis X of the cylindrical housing 10. On the radially inner side, each cradle 21 is provided with a spherical or spherical-segment-shaped convex support surface 27' of the ball joint 27. As a counter-support surface, a spherical or spherical-segment-shaped concave support surface 27" is provided on the support means 19, against which the convex support surface 27' is supported. In the case of identical ball radii, a ball-joint support is provided here. Alternatively, also a point support would be possible, however with reduced carrying capacity and rigidity properties.

The anchoring structure 26 has two structure beams 26', 26" spaced apart from each other in the circumferential direction of the cylindrical bracket element 13 and extending parallel to the longitudinal axis X' of the cylindrical bracket element 13. The first strut 22 and the second strut 23 are connected, spaced apart from each other on the structure beam 26' in the direction of the axis X', to the first structure beam 26'. The third strut 24 and the fourth strut 25 are connected, also spaced apart from each other in the direction of the longitudinal axis X' of the cylindrical bracket element 13, to the second structure beam 26". In this way, the four struts 22, 23, 24, 25, which extend radially in different directions from the cradle 21, form a spatial structure which, together with the structure beams 26', 26" attached to the cylindrical bracket element 13 and the cradle 21, defines the support structure 20. In this connection, the struts 22, 23, 24, 25 are held clamped to the anchoring structure 26, and to this end the structure beams 26', 26" have clamping means. The structure beams with the clamping means form the anchoring structure 26.

As can be seen in FIG. 2, the individual struts 22, 23, 24, 25 have a strip-like shape, which means that their widthwise extension in a plane parallel to the longitudinal axis X' of the cylindrical bracket element 30 is greater than in a direction that extends parallel to a tangent to the cylindrical bracket element 13 in the region of the associated structure beam 26', 26".

Each of the struts 22, 23, 24, 25 has associated therewith an actuator element 22', 23', 24', 25', which for reasons of clarity are shown in FIG. 2 on the support structure 20'. Each of the actuator elements 22', 23', 24', 25' can be driven by a respectively associated actuating drive 22", 23", 24", 25" in such a way that the actuating element 22', 23', 24', 25' can exert a force onto the lateral surface of an associated strut 22, 23, 24, 25. By exerting such a force onto the strut, this strut can be laterally deflected, for example a bending moment can be applied to it, so that it can bend out from the plane extending parallel to the longitudinal axis X' of the cylindrical bracket element 13, in which the strut extends in its elongated orientation. As a result, the linear distance between the end of the strut that is attached to the cradle 21 and the end of the strut that is attached to the associated structure beam 26', 26" is reduced, so that the corresponding point of articulation of the strut on the associated structure beam and thus on the cylindrical bracket element 13 is pulled slightly radially outwards.

The individual support structures 20, 20', 20" thus have a plurality of very thin strut strips, which are arranged within at least three guide chains formed by the support structures in such a way that their kinematic dimensions allow, by means of a number of more than six actuating drives, on the one hand an adjustment of its output side platform (bracket means 15) with the attached secondary mirror 16 in all six degrees of freedom (corresponding to a parallel kinematic with the degree of freedom F=6, "Hexapod"), and on the other hand that in combination with the number of actuating drives, which goes beyond the six actuating drives, pretension and torsion of each individual guide chain can also be adjusted due to implemented so-called "identical degrees of freedom". Here, each strut has associated therewith an actuating drive that is supported, together with the remaining actuating drives of the respective guide chain (support structure), on support means 19 provided on a rotationally symmetrical support ring 17 fixed to the housing by means of the spherically supported cradle 21. This already results in a crucial precondition for a controllable scattered light minimization.

Figure 3:
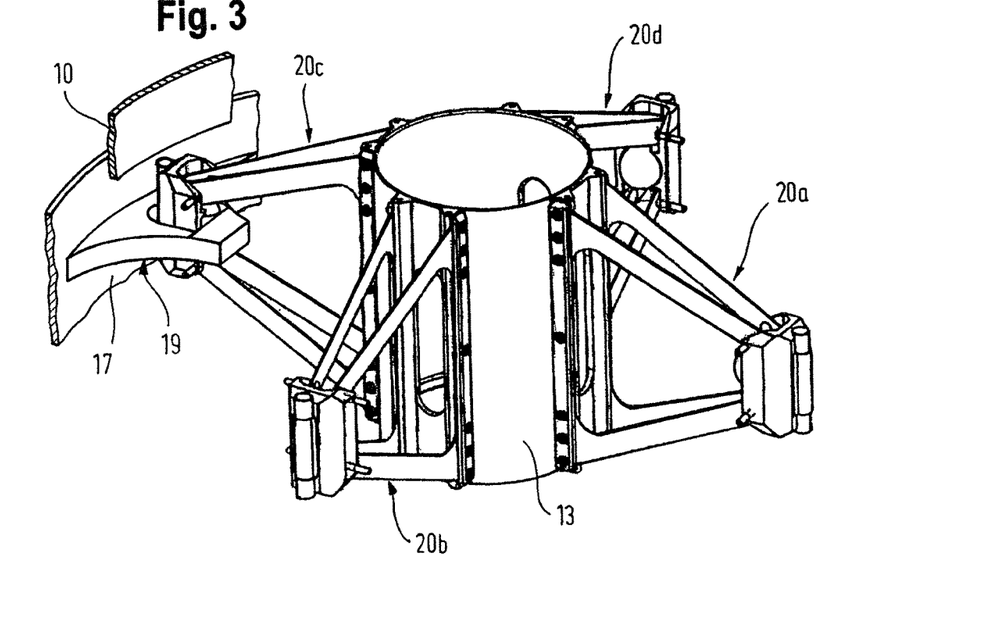
FIG. 3 shows an alternative support assembly with four support structures.
Figure 4:
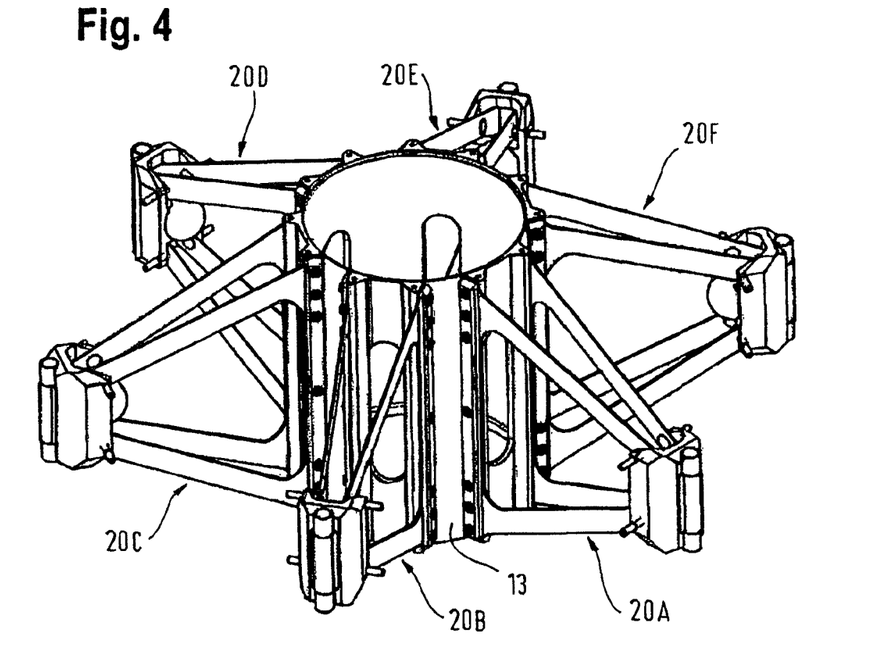
FIG. 4 shows another alternative support assembly having six support structures.

FIG. 3 shows a support assembly according to exemplary embodiments of the invention having four support structures 20a, 20b, 20c, 20d and FIG. 4 shows one with six support structures 20A, 20B, 20C, 20D, 20E, 20F, each of which are attached to the cylindrical bracket element 13 at equal distances from each other in the circumferential direction and are supported on the fixed frame ring 17 that is connected to the housing 10. In terms of their construction, the support structures shown there correspond with those from FIG. 2.

The adjustment mechanism formed in this way for the orientation and position of the longitudinal axis X' of the bracket element 13, and consequently for the orientation and position of the optical axis of the secondary mirror 16 connected to the bracket element 13 by means of the bracket means 15, will be explained in detail below.

Figure 5:
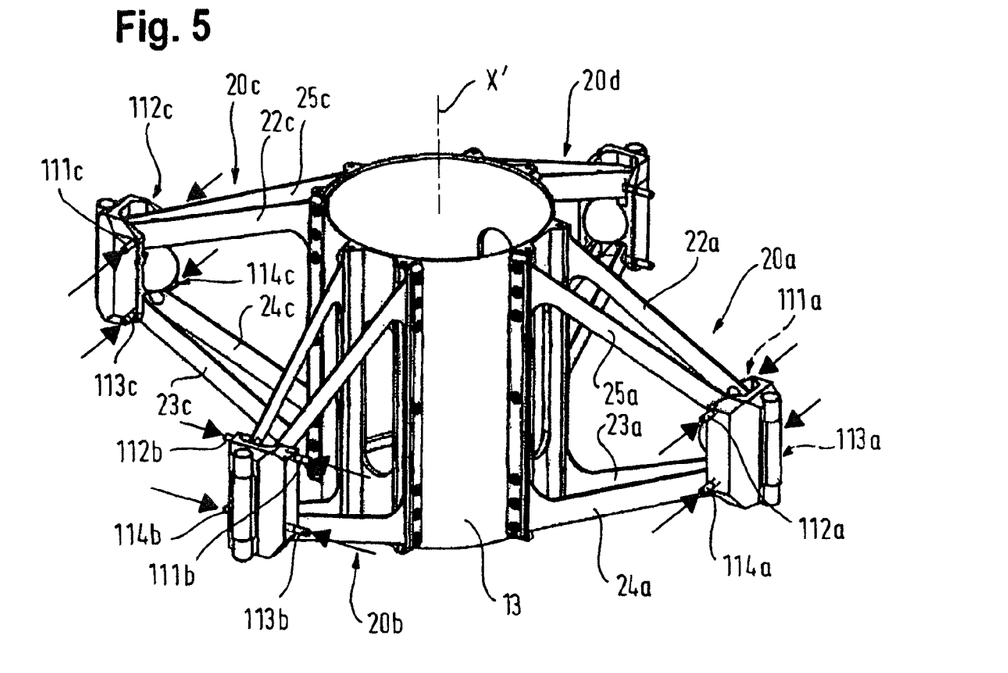
FIG. 5 shows force application points of the actuator elements on the support structures on the example variant from FIG. 3.
Figure 6:
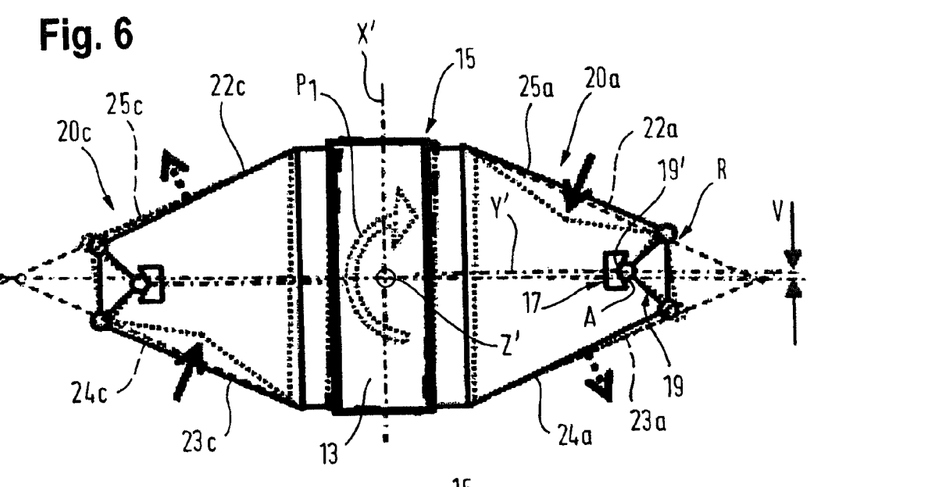
FIG. 6 shows a schematic illustration of two oppositely positioned support structures of a support assembly according to exemplary embodiments of the invention for explaining a laterally directed deflection of the object.
Figure 7:
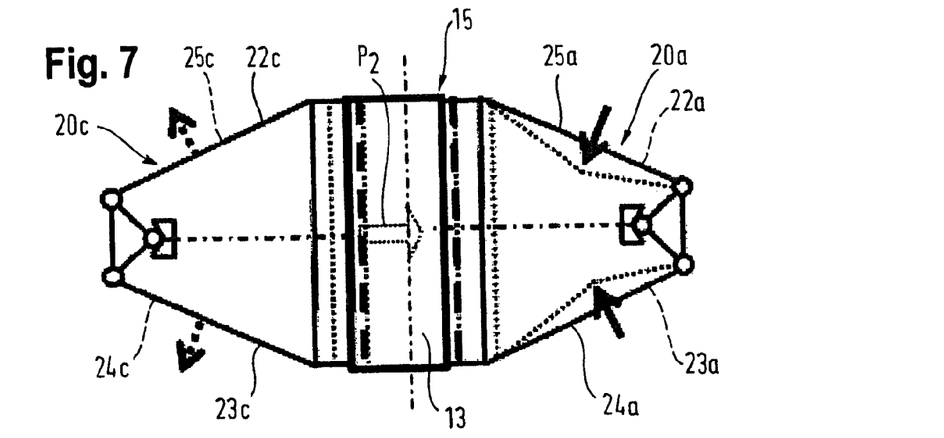
FIG. 7 shows a schematic illustration of two oppositely positioned support structures of a support assembly according to exemplary embodiments of the invention for explaining tilting of the object.

The adjustment concept further described with reference to FIG. 5 to FIG. 7, is based on the lateral bending deflection described above of individual strip-like struts by means of the actuator elements driven into motion by an associated actuating drive, starting from a pre-tensioned initial position of the respectively associated strut in the vicinity of the elongated orientation (first order singularity). Due to the initially extremely high actuation transmission ratios that can be achieved as a result, a very high sensitivity of adjustment is achieved, which is particularly error-tolerant in relation to control deviations of the actuating drives and at the same time effects low return forces on the actuating drives.

The individual struts may for example be formed from very thin, longitudinally rigid metal sheets having a sufficient bending elasticity in the transverse direction. Alternatively, also assemblies of individual filaments, wires, tissues or composite materials may be used as struts, which in the initial position thereof each form a thin, planar structure. In this respect, parts of the support structures that form the described kinematic structure, consist of strut elements that are combined to form integral structures, which integral structures form the individual struts.

As a result of a kinematic constrained motion of the support structures 20a, 20b, 20c, 20d forming guide chains relative to each other, as described below in respect of the embodiment shown in FIG. 3 with reference to FIG. 5, an on-edge arrangement of the strip-like struts in the direction of the longitudinal axis X is made possible, which at the same time clearly increases, through the geometrical moment of inertia, the rigidity of the secondary mirror attachment with regard to the pitch and the yaw axis. The pitch axis not shown in FIG. 5, and the yaw axis which is not shown there either, are orientated orthogonally relative to each other and moreover each extend orthogonally to the longitudinal axis X of the telescope, which forms a roll axis. The actuating drives for the actuator elements exerting a bending force on the respective struts, to which reference is made in the functional description following below, are shown in FIG. 5.

The deflections caused by the actuating drives on three bending positions for each strut are always carried out in the transverse direction thereof. The reason is that if a bending of the strut is carried out on the point of attack of the actuator, then the strut pre-tensioned thereby also has to have two bending places at its clamping positions; this corresponds to the clamping of a triangle in the case of a planar strut of a not yet deflected support structure. In FIG. 2, these further bending places would be located on the anchoring structure 26 as well as on the point of engagement around the support pin 21' through the central section 21' of the X-shaped metal strut sheet.

Thus, the bending positions constitute one-dimensional solid state pivots, wherein however the pivot axes of these solid state pivots spatially move, for geometrical reasons, on the points of attack of the actuating drives as per the constrained motion. The actuating drives shown in this embodiment example are therefore attached to the respectively associated strut via a ball joint. Arrangements of rotary thrust joints are also possible in these places.

The adjustment of the pitch and yaw angles of the bracket means 15 for the secondary mirror 16 (arrow $P_1$ in FIG. 6) will be illustrated below by way of the example of a spider-type arrangement with support structures forming four guide chains according to FIG. 5 with reference to the schematic illustration in FIG. 6. The pitch and yaw angles are the angles of a pivoting movement of the telescope about the pitch axis Y' and about the yaw Z', respectively.

If the actuating drives 111a and 112a of the two struts 22a and 25a of the support structure 20a and the actuating drives 113c and 114c of the two struts 23c and 24c of the support structure 20c are advanced in the direction of the arrow, i.e. they exert a force on the respective strut, and if at the same time the actuating elements of the actuating drives 113a and 114a, which are arranged in mirror symmetry, of the two struts 23a and 24a of the support structure 20a as well as 111c and 112c of the two struts 22c and 25c of the support structure 20c are relaxed against the direction of the arrow, then a change to the kinematic lengths of the corresponding struts will result, as is clearly shown by the simplified rolling off into the plane as per FIG. 6.

However, the deformation of the real geometry of the struts in the transverse direction according to FIG. 5 requires the following two kinematic constrained motions:

1. a spatial displacement of the rotary pole on the point of attack, i.e. the strip-like struts are twisted on both sides of the point of attack of the actuator element of the actuating drives, and for this reason the actuating drives or the actuator elements also have to be attached to the respective strut via a ball joint, if they not only apply stress onto the strut under contact, but are coupled therewith;

2. a kinematic compensation of the polhode displacement V according to FIG. 6 in relation to the support points A, which can be realized according to exemplary embodiments of the invention on the basis of the known principle of a Roberts linkage, by transferring his functional principle to a spatial transmission, wherein the output point of the Roberts linkage R is here spherically supported in a housing-fixed manner, and moreover its kinematic dimensions are to be chosen in such a way that, including adjustment-related changes to the strut length, its deflection at the point A (in FIG. 6) in a vertical direction exactly corresponds to the amount of polhode displacement V.

Analogously to the triangle of the planar Robert linkage R, in the case of a spatial transmission a pyramid results, the vertex of which is spherically supported on the support means 19 on the frame ring 17, and on the further (base) corners, the actuating drives 111 to 114 engage in each case in the manner of a ball joint. If the above-mentioned constrain conditions are met, then all of the respectively oppositely arranged, guide chain-forming support structures 20a, 20c and 20b, 20d, respectively, of the spider-like support assembly will inevitably correspond to each other about the said adjustment rotary pole of the bracket means 15 for the secondary mirror 16, due to its rotationally symmetrical arrangement. The cradles 21 are inclined here in opposite directions to the adjustment angle of the bracket means 15 for the secondary mirror 16.

In the light of the support assembly with four support structures it becomes clear that the two support structures arranged orthogonally relative to each other for changing the adjustment angle must carry out a rotational movement about the support point 19' of the respective cradle 21 about its axis of symmetry, in order to avoid torsion of these struts. From the described degree of freedom of each individual support structure with a ball joint attachment to the frame ring 17, also the possibility of providing support assemblies with theoretically any desired number of support structures results, such as for example six support structures according to FIG. 4, whilst at the same time adjustment movements about the pitch axis and about the yaw axis can be superimposed as desired. Analogously thereto, also tolerances and possibly resulting asymmetries are automatically compensated by the individually adjusting pitch and yaw movements of the cradles, once the adjustment of the support assembly is complete.

The horizontal and vertical adjustment of the bracket means 15 for the secondary mirror 16 is carried out, in the example of the support assembly shown in FIG. 5 with four support structures according to the schematic illustration in FIG. 7, in a similar manner.

For a lateral parallel displacement of the bracket means 15 for the secondary mirror 16 to the right (arrow $P_2$), the four actuating drives 111a to 114a of the struts 22a, 23a, 24a, 25a of the right-hand support structure 20a (see FIG. 7) are synchronously advanced in the direction of the arrow, with a deflection (bending force) acting on the respective strut being increased, whilst the actuating drives 111c to 114c of the struts 22c, 23c, 24c, 25c of the opposite, corresponding support structure 20c are relaxed in a temporally synchronous manner in opposite directions.

On the support structures 20b, 20d which are positioned orthogonally thereto, this movement is automatically compensated by corresponding rolling movements of the associated cradles (about an axis of the ball joint). It becomes clear here that the rolling movement of each cradle could be changed as desired and thus again be compensated by a lateral offset of the associated actuating drives (advancing of 111b and 113b as well as relaxing of 112b and 114b as well as in mirror symmetry on the opposite support structure). Conversely, this shows that in the case of a lateral offset adjustment of the actuating drives on the cradles of all the support structures (any number), which adjustment is orientated in the same direction all round, an adjustment of the bracket means 15 for the secondary mirror 16 about the roll axis thereof is made possible. This degree of freedom is relevant for the fine adjustment of off-axis optics.

The adjustment of the focal distance by a coaxial displacement of the bracket means 15 for the secondary mirror 16 with respect to the primary mirror 12 along the longitudinal axis X (in FIG. 5 upwards) is made possible by advancing (increasing the bending force) all the actuating drives at the top side of the spider-like support assembly, namely on the actuating drives 111 and 112, and by correspondingly relaxing (reduction of the bending force) all the remaining actuating drives 113 and 114 at the bottom side of the support assembly. A corresponding reverse actuation of all the actuating drives leads to a coaxial displacement of the bracket means 15 for the secondary mirror 16 in the opposite direction.

The spider-like support concept described allows a sensitive fine adjustment of the bracket means 15 for the secondary mirror 16 in respect of all six degrees of freedom to be made, which is free of play and hysteresis, at the same time very robust and stable in the long term and which can also be checked and recalibrated at any time.

Scattered light minimization additionally requires that in addition also all the strip-like struts can be adjusted over the entire length thereof parallel to the entering and exiting bundles of light of the telescope, which unlike the pure parallel kinematic of a hexapod requires a greater degree of freedom on the input side (=>hybrid parallel kinematic). In the case of deflectability of the exiting bundles of light that can be controlled within the telescope, such as for example by means of a gimballed secondary mirror 16 or by means of other upstream optical components, it must be possible to carry out the strut orientation in an angle and phase synchronous manner with the bandwidth of the controlled beam deflection, without in the process causing any modification to the intended adjustment condition of the support assembly.

According to exemplary embodiments of the invention, an optimized strut alignment for realizing minimal shadowing surfaces can be realized as follows:

Following a correct adjustment of the bracket means 15 for the secondary mirror 16 coaxially to the optical axis of the primary mirror 12, the radially inward attachments of the struts on the cylindrical bracket element 13 are already orientated to be parallel to the optical axis of the primary mirror 12, which coincides with the longitudinal axis. For scattered light minimization on the telescope with a fixed secondary mirror 16, the radially outward attachments of the combined struts, which are supported on the frame ring 17, must be twisted via the cradles 21 by means of the four respectively associated actuating drives exactly to the adjusted angle of the radial inward attachments of the struts. According to exemplary embodiments of the invention, this is achieved by means of a targeted control of the initially mentioned "identical degrees of freedom" using the same actuating drives that are also required for realizing the degrees of freedom for the adjustment. For the right-hand support structure 20a in FIG. 5, this is carried out for example by advancing the actuating drives 111a and 114a in the same direction as well as by relaxing the actuating drives 112a and 113a or vice versa, in the same way, analogously, as for all the further support structures in a synchronous manner. What is significant for this purpose is the respective spatial angle positioning of the struts on the point of attack of the actuator elements attached via a ball joint, as has already been described above in respect of the pitch angle adjustment. The planarity of the strip-like struts, which can be restored as a result, realizes a minimal projection surface to the light bundle axes over the entire strut length independently of the respective adjustment condition, as a result of which any critical reflections on the longitudinal sides of the struts can be completely avoided.

As all the required adjustment travels for this purpose increase, the strut pretension would slightly rise, and this, too, can be adjusted by means of a synchronous advance movement or relaxation of all the actuating drives of respectively opposite support structures, or can be controlled by a collective adjustment of all the actuating drives of the pretension condition of the entire support assembly. In the case of a telescope with internal beam deflection, the torsion angles of the struts can be overcompensated using the same method in such a way that the struts extend, in the area of maximum intensity of the beam bundles deflected within the telescope, exactly parallel thereto, and at the same time the deviations are greatest where the radiation intensity is lowest. Where the beams pass centrally through the struts, the torsion angle on the cradle that is to be adjusted would for example correspond exactly to twice the angle of inclination of the light bundle transversely to this strut. On the basis of the relative low mass inertia of the cradles 21, it is possible to achieve large adjustment bandwidths by means of the actuation drives in conjunction with an optimally matched transmission given a sufficient strut pretension.

A radial minimum pretension of the struts is indispensable for the adjustability and for the stable use of the support assembly shown, any further increase of this pretension within the load limits of the struts will have an increasingly positive effect both with regard to robustness against external influences (thermal expansion, vibration etc.) and with regard to the achievable bandwidth with the actuation drives as well as external excitations by upstream actuation systems (transverse acceleration in the case of telescope pivoting etc.). The pretension condition of the support assembly that will be achieved in each case after all the adjustment travels, can advantageously be quantitatively confirmed by way of a sound spectrum analysis of the individually excited struts.

A possible telescope construction that includes the above-described hybrid parallel kinematic of the support assembly with the degree of freedom F=6 as a "spider" with redundant actuating drives for realizing six controllable identical degrees of freedom can also be analyzed by means of the Grubler formula known to a person skilled in the art for determining the running degree of spatial mechanisms.

Figure 8:
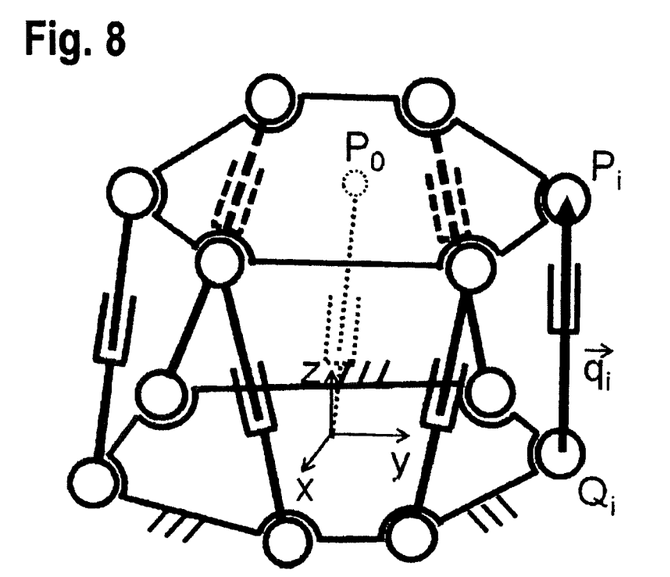
FIG. 8 shows a schematic illustration of a Steward platform.
Figure 9:
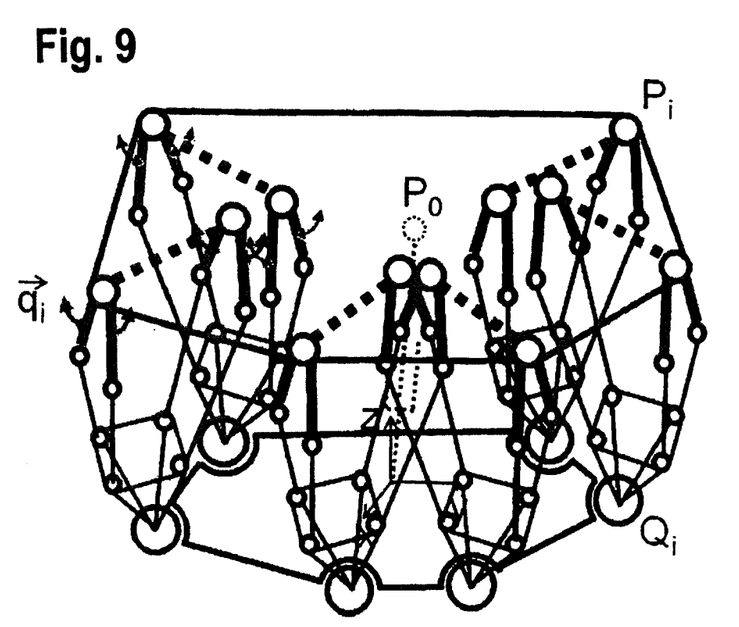
FIG. 9 shows a schematic illustration of a kinematic chain of a support assembly according to the invention having six support structures.

To improve clarity, this can be derived by way of a comparison with a so-called Steward platform that is schematically shown in FIG. 8, which especially for this reason is assumed to have twelve ball joints, so that six "identical" or "non-limiting" degrees of freedom (possibility of rotating the actuating drives about their longitudinal axes) develop. A construction of the kinematic chain according to FIG. 9 in relation to the feasibility according to exemplary embodiments of the invention of all of the adjustment possibilities as described above of a spider with six guide chains (support structures), six ball joints, sixty one-dimensional solid state joints (strut bending), fifty-six links and six "identical degrees of freedom" on the cradles will according to this lead to the same result, with the "identical degrees of freedom" being controllable in a targeted manner by the redundant number of actuating drives per support structure.

Exemplary embodiments of the invention therefore relates to a support assembly designed as a telescope spider, on the basis of a hybrid parallel kinematic, for a sensitive, fine adjustability of the secondary mirror receptacles in optical mirror telescopes in all six degrees of freedom free of play and hysteresis, the guide chains (support structures) of which, which are fixed to the secondary mirror receptacle, each have four strip-like struts which are relatively wide in relation to their thickness, each of which have associated therewith exactly one actuating drive that is supported, together with the remaining struts of the same guide chain, in relation to the cradle spherically supported on the support element of the telescope frame ring.

The principle of this telescope spider is also suitable for adjusting off-axis optics, and in this respect also any desired arrangements of the kinematic structure outside of the telescope apertures are conceivable.

In order to avoid or reduce scatter radiation, the possibility for beams to pass through the spider-like support assembly is based on especially thin strip-like struts, the orientation of which with any support structure can be individually controlled irrespective of the adjustment condition of the telescope spider. As a result, a minimization of the projection surfaces becomes possible as a direct match with the achieved adjustment condition of the bracket means 15 for the secondary mirror 16 (as a required boundary condition therefor).

The described control method for orientating the strip-like struts is also suitable for telescopes with integrated optronic beam deflection of a high bandwidth as described above, and the boundary conditions required for this can be derived, transformed and phase-synchronically superimposed on the commanding of the actuating drives of the cradles, directly from the commanding of the optronic actuating system and the deflection of the light bundles resulting therefrom (corresponding to the selected targeted variables for scattered light minimization).

The control of the scattered light minimization is carried out by means of the same actuating drives as for adjusting the secondary mirror suspension (bracket means 15), and the actuating movements for each support structure, which are realized to this end, utilize the "identical degrees of freedom" of the kinematics in a targeted manner. As a result, independence between the adjustment condition of the bracket means 15 and the orientation condition of the struts is achieved.

Due to the radially symmetrical pretension of all the struts at the same time with advantageous adaptability of their thermal expansion coefficient, a mechanically and thermally robust design with high long-term stability in conjunction with the geometric similarity of the support structures is achieved in a radially symmetrical and axially symmetrical arrangement. As a result of the large range of possible pretensions that can be realized, the support assembly can also be dynamically adapted in respect of components to be received on the bracket means 15 for the secondary mirror 16.

A very favorable mass-rigidity ratio is achieved by means of strip-like struts that are pretensioned in a kinematically even manner without warping, standing on edge relative to the directing movement as a result of a constrained motion that can be carried out in a kinematically exact manner due to a compensation of the polhode displacements. The dynamic rigidity that can be achieved as a result and the resulting high eigenfrequencies of the entire secondary mirror receptacle including the support assembly according to exemplary embodiments of the invention, allow extremely high directing accelerations of the telescope, whilst at the same time a high optical quality is maintained.

As a result of this dynamic robustness, also high bandwidths of the actuating drives for adjustment as well as for the actuating system fixed to the bracket means 15 for the secondary mirror 16 are made possible.

The support assembly designed as a telescope spider may theoretically include any desired number of support structures (however a minimum of two) and will obtain increasingly isotropic rigidity characteristics as their number increases. As a result, apart from the fact that the highest directing accelerations become feasible, also the possibility of any desired telescope pivot angles for a complete spherical coverage (rollover capacity in the field of gravity of the earth) is achieved, whilst at the same time a high optical quality is maintained.

Both the adjustment of the support assembly and the scattered light minimization can either be continuously controlled, for example by means of a control unit, and/or can be calibrated for example under the control of the control unit, in time intervals.

In as far as the actuating drive have self-locking properties on the output side, any locking brakes may be dispensed with (secure condition after taking out of service for transport, as well as in the case of an accident).

In as far as sensors for adjusting the telescope construction are integrated on the bracket means 15 for the secondary mirror 16, this support assembly may be used at any time for carrying out self-calibration.

The tension condition of the individual struts that is achieved in each case can be checked at any time by means of sound spectrum analysis and can be monitored. The required excitation for this purpose could be provided via a pulse of the actuating drive associated with the individual struts.

The actuating drives provided on the cradles for the actuator elements are advantageously located close to the frame ring 17, on which the support structures are attached, so that the electric attachment thereof is possible outside of the annular optical aperture 18.

The individual struts are advantageously implemented so as to be electrically conductive, so that on the one hand electrical potential compensation relative to the bracket means 15 for the secondary mirror 16 can be carried out and on the other hand, with regard to this potential, an energy supply to actuating systems for the secondary mirror, which are installed in the bracket means 15 for the secondary mirror 16, may be realized via the remaining struts.

Reference signs in the claims, the description and the drawings are merely used to facilitate the understanding of the invention and are not intended to limit the scope of protection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

1 Telescope
2 Support assembly
10 Cylindrical housing
11 Support structure
12 Annular, concave primary mirror
13 Cylindrical bracket element
14 First aperture
15 Bracket means
16 Secondary mirror
17 Frame ring
18 Second aperture
19 Support means
19' Support point
20 Support structure
20' Support structure
20" Support structure
20a Support structure
20A Support structure
20b Support structure
20B Support structure
20c Support structure
20C Support structure
20d Support structure
20D Support structure
20E Support structure
20F Support structure
21 Cradle
21' Central section
21" Support pin
21''' Cradle body
22 Strut
22' Actuator element
22" Actuating drive
22a Strut
22c Strut
23 Strut
23' Actuator element
23" Actuating drive
23a Strut
24 Strut
24' Actuator element
24" Actuating drive
24a Strut
25 Strut
25' Actuator element
25" Actuating drive
25a Strut
25c Strut
26 Anchoring structure
26' Structure beam
26" Structure beam
27 Ball joint
111 Actuating drive
111a Actuating drive
111b Actuating drive
111c Support structure
112 Actuating drive
112a Actuating drive
112b Actuating drive
112c Support structure
113 Actuating drive
113b Actuating drive
113c Actuating drive
114 Actuating drive
114b Actuating drive
114c Actuating drive
A Support point
R Triangle of the Roberts linkage (schematic)
V Polhode displacement
X (Longitudinal axis) mirror telescope axis
X' Longitudinal axis
x Axis
x' Axis
x" Axis Y' Pitch axis
Z' Yaw axis

The invention claimed is:

1. An adjustable support assembly for an object of an optical mirror telescope to be accurately positioned relative to a base, the adjustable support assembly comprising:
at least one support structure connected to the base and to the object;
at least two struts extending in a non-parallel manner relative to each other,
wherein each of the at least two struts has an associated drivable actuator element that is configured to apply a force onto a corresponding one of the at least two struts such that the corresponding one of the at least two struts is deflected transversely to a longitudinal extension thereof, and
wherein the at least one support structure is supported relative to the base in an articulated manner; and
a plurality of support structures that form a suspension of the object that corresponds to a main mirror,
wherein the base comprises a housing of the optical mirror telescope,
wherein the object further comprises a bracket means of a secondary mirror of the optical mirror telescope, and
wherein the secondary mirror is coaxially adjustable by the drivable actuator elements relative to the main mirror in relation to a mirror telescope axis of the optical mirror telescope.

2. The adjustable support assembly as claimed in claim 1, wherein each of the drivable actuator elements is driven by a driven element of an actuating drive.

3. The adjustable support assembly as claimed in claim 2, wherein the at least one support structure has at least four struts extending in a non-parallel manner relative to each other.

4. The adjustable support assembly as claimed in claim 2, wherein the actuating drives of the drivable actuator elements are connected to a common open or closed-loop control unit that is configured to transfer actuating signals.

5. The adjustable support assembly as claimed in claim 2, wherein each of the at least two struts are formed in a strip-like manner and arranged such that their planar sides extend in a plane orientated substantially parallel to the mirror telescope axis.

6. The adjustable support assembly as claimed in claim 1, wherein the at least one support structure has at least four struts extending in a non-parallel manner relative to each other.

7. The adjustable support assembly as claimed in claim 1, wherein the adjustable support assembly comprises at least two support structures connected to the base and to the object.

8. The adjustable support assembly as claimed in claim 1, wherein the adjustable support assembly comprises at least three support structures connected to the base and to the object.

9. The adjustable support assembly as claimed in claim 1, wherein the adjustable support assembly comprises at least four support structures connected to the base and to the object.

10. The adjustable support assembly as claimed in claim 1, wherein
each of the at least two struts has a first end section that is close to the base and a second end section that is close to the object, and
wherein each of the associated drivable actuator elements is arranged such that the force is applied to a corresponding strut, which is exerted on such corresponding strut using a drive, in one of the first and second end sections.

11. The adjustable support assembly as claimed in claim 1, wherein each of the at least two struts has a strip-like shape.

12. The adjustable support assembly as claimed in claim 1, wherein the associated drivable actuator elements or a further drivable actuator element of the at least two struts is configured to apply a force onto a corresponding one of the at least two struts, using a drive that exerts a torsional moment onto such strut.

13. The adjustable support assembly as claimed in claim 1, wherein each of the at least two struts are formed in a strip-like manner and arranged such that their planar sides extend in a plane orientated substantially parallel to the mirror telescope axis.

* * * * *